S. T. UMBERGER.
NUT LOCK.
APPLICATION FILED OCT. 1, 1912.
1,145,100.
Patented July 6, 1915.
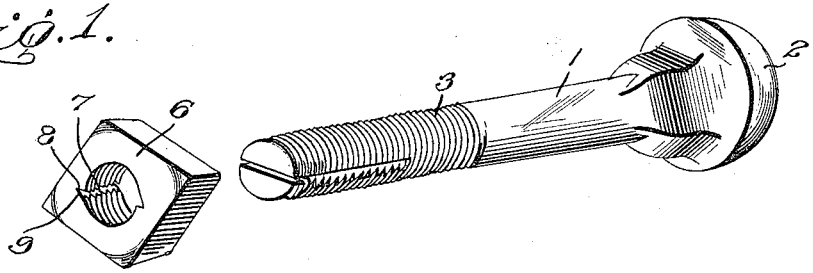
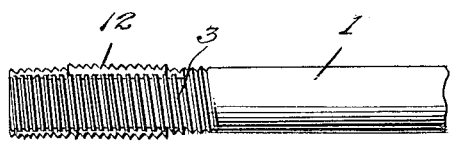
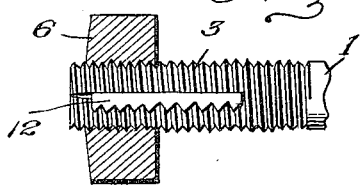
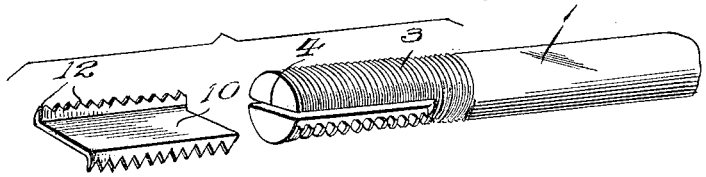
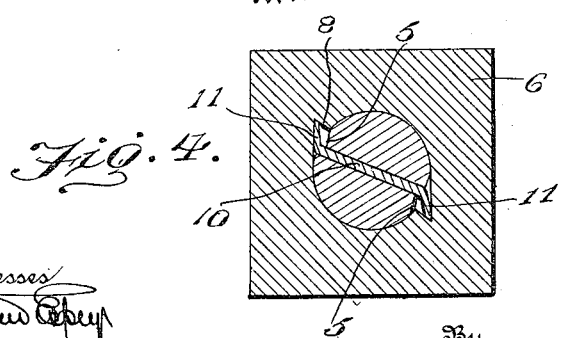
Inventor
S. T. Umberger:
Witnesses
By
Attorneys

UNITED STATES PATENT OFFICE.

SAMUEL T. UMBERGER, OF GLOSTER, MISSISSIPPI.

NUT-LOCK.

1,145,100.  Specification of Letters Patent.  Patented July 6, 1915.

Application filed October 1, 1912. Serial No. 723,447.

*To all whom it may concern:*

Be it known that I, SAMUEL T. UMBERGER, citizen of the United States, residing at Gloster, in the county of Amite and State of Mississippi, have invented certain new and useful Improvements in Nut-Locks, of which the following is a specification.

This invention relates to nut locks and has as its object to provide a novel and highly efficient means for securely locking a nut upon its bolt.

The invention has as one of its objects to provide a locking device so constructed that the nut will be positively held against backward rotation upon the bolt, although the locking device may be readily removed should it be desired to unscrew the nut from the bolt.

Another aim of the invention is to so construct the locking device that it may be removed to permit of removal of the nut, without in any way injuring the threads of the nut or the bolt.

Still further the invention aims to provide a locking device of the class mentioned which will act to lock the nut at any point in its rotative movement by friction and at certain definite points, positively.

For a full understanding of the invention reference is to be had to the following description and accompanying drawing, in which:—

Figure 1 is a perspective view of a bolt equipped with the locking device embodying the present invention, and of the nut which is to be fitted upon the bolt. Fig. 2 is a view in side elevation of the bolt, a portion of the locking device being broken away. Fig. 3 is a perspective view of the bolt and the locking device, the latter being removed from the bolt. Fig. 4 is a detail transverse sectional view through the nut, the bolt and locking device being shown in elevation. Fig. 5 is a cross sectional view through the nut and bolt.

Corresponding and like parts are referred to in the following description and indicated in all the views of the accompanying drawing by the same reference characters.

In the drawing the bolt is indicated in general by the reference numeral 1 and is provided with the usual head 2. The threaded portion of the bolt is indicated at 3 and the bolt in its said portion is formed with a longitudinally extending slot 4 which opens at the extremity of the said portion and at the sides thereof.

By referring to Fig. 4 of the drawing it will be observed that the slot 4 extends diametrically through the bolt and that the threaded surface of the bolt at the opposite sides of the slot is flattened as at 5. The purpose of so forming the bolt will be presently fully explained.

The nut which is to be fitted upon the bolt is indicated by the numeral 6 and may be of any ordinary form, the wall of its bolt opening being formed with notches 7 which are substantially diametrically oppositely located. Each of the notches 7 has an abrupt wall 8 and a wall 9 which extends at an acute angle to the wall 8. The walls 8 of the two notches are located in a plane which extends diametrically across the bolt opening of the nut, whereas the walls 9 lie in planes which are tangential to the said bolt opening.

The nut locking device embodying the present invention consists essentially of a plate 10 of resilient sheet metal which has its lateral edge portions bent at an obtuse angle to the plane of the plate, as indicated at 11 and formed with a number of teeth 12 separated in the same manner as the threads 3. The plate 10 is assembled with the bolt 1 by fitting it in the slot 4 and when assembled with the bolt its flanges 11 will assume about the position shown in Fig. 4 of the drawing. In this position, each flange 11 lies in a plane substantially tangential to the threaded surface of the bolt.

It will also be observed by referring to Fig. 4 that each flange 11 is located opposite to the flattened surface 5 of the bolt at the side of the slot 4. In Fig. 2 it will be observed that the toothed edges of the flanges project beyond the circumferential surface of the bolt-shank.

From the foregoing description of the invention it will be understood that the locking member or dog 10 is first assembled with the bolt in the manner shown in Figs. 1, 2 and 4 of the drawing, and is so positioned within the slot 4 that the teeth upon its flanges 11 will register with the threads of the bolt. The nut 6 is then threaded onto the bolt and as the threaded portion of the wall of the bolt-opening in the nut rides over the toothed flanges 11, the teeth of the flanges will project between the threads of the nut and the flanges will be pressed inwardly to a slight degree so as to seat against the flattened portions 5 of the bolt-shank. Due to the fact that the teeth of the flanges project beyond the circumferential surface of the bolt, the nut will be frictionally locked at any point in its rotative movement for the reason that any backward rotation of the nut will cause the points of the teeth to bite into the nut between the threads. In order to positively lock the nut against backward rotation upon the bolt, it is only necessary to turn the nut a sufficient distance to allow the toothed flanges to spring into the recess in the wall of the bolt opening. After the nut has been rotated to such position, any backward movement of the nut upon the bolt will result in the abrupt walls 8 of the notches being brought to bear directly against the points of the teeth 12 and the pressure exerted by these walls against the teeth will therefore be in the same line as the line of projection of the flanges 11 from the plate 10. Consequently, the backward rotation of the nut or an attempt to rotate it backwardly upon the bolt will not result in stripping of the threads of the nut or bolt. It will be observed that the slot 4 extends practically throughout the entire length of the threaded portion of the bolt. Inasmuch as the notches 7 are of a depth greater than the depth of the threads in the wall of the bolt opening, when the nut is in the position stated, the locking dog 10 may be slid outwardly from the bolt 4 and entirely removed, whereupon the nut may be unscrewed from the bolt.

It will thus be seen that while the locking dog is arranged to securely and firmly hold the nut against backward rotation, upon the bolt, it may be readily removed so as to permit of the removal of the nut. It will further be seen that the locking device is extremely simple, may be readily stamped from resilient sheet metal and may be assembled with the bolt without the use of tools.

It will be understood that the slot in the bolt may be closed after the locking member has been inserted therein, by compressing the end of the bolt as shown in the drawing so as to prevent accidental disengagement of the locking member from the slot, it being understood that should it be desired to remove the locking member the slot may be opened or widened in the end of the bolt by means of a screw driver or other flat-sided implement.

Having thus described the invention what is claimed as new is:—

The combination with a threaded bolt having a longitudinally disposed opening extending diametrically therethrough, the threads of the bolt being cut away to provide flattened portions at reverse extremities of opposite walls of the opening, of a nut threaded to engage the bolt and provided at its opening with oppositely disposed notches each having one wall radial to the opening and another wall tangential thereto, and a locking member including a substantially flat resilient plate removably fitting in the opening in the bolt and having its lateral edges turned to form substantially straight and oppositely extending angularly disposed flanges projecting tangentially to the bolt beyond the circumferential surface thereof, the said flanges overlying the flattened portions of the bolt and being disposed to ride over the tangential walls of the said notches and to engage the radial walls thereof, the outer edges of the flanges being provided with teeth arranged to register with the threads of the bolt and disposed to engage between the threads of the nut.

In testimony whereof I affix my signature in presence of two witnesses.

SAMUEL T. UMBERGER. [L. S.]

Witnesses:
  H. T. CUMING,
  E. LEE TALER.

Copies of this patent may be obtained for five cents each, by addressing the "Commissioner of Patents, Washington, D. C."